United States Patent
Ren et al.

(10) Patent No.: US 12,072,586 B2
(45) Date of Patent: Aug. 27, 2024

(54) PIXEL ELECTRODE, PIXEL STRUCTURE, DISPLAY PANEL, AND DISPLAY APPARATUS

(71) Applicants: Ordos Yuansheng Optoelectronics Co., Ltd., Inner Mongolia (CN); BOE Technology Group Co., Ltd., Beijing (CN)

(72) Inventors: Wei Ren, Beijing (CN); Wei Li, Beijing (CN); Yanfeng Li, Beijing (CN); Haoyi Xin, Beijing (CN); Jing Li, Beijing (CN); Jingjing Xu, Beijing (CN); Chenrong Qiao, Beijing (CN); Yanyong Song, Beijing (CN); Xu Qiao, Beijing (CN); Rula Sha, Beijing (CN); Min Zhang, Beijing (CN)

(73) Assignees: Ordos Yuansheng Optoelectronics Co., Ltd., Inner Mongolia (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/441,272

(22) PCT Filed: Dec. 11, 2020

(86) PCT No.: PCT/CN2020/135623
§ 371 (c)(1),
(2) Date: Sep. 20, 2021

(87) PCT Pub. No.: WO2022/120783
PCT Pub. Date: Jun. 16, 2022

(65) Prior Publication Data
US 2023/0296942 A1    Sep. 21, 2023

(51) Int. Cl.
*G02F 1/1343* (2006.01)
*G02F 1/1345* (2006.01)

(52) U.S. Cl.
CPC .... *G02F 1/134309* (2013.01); *G02F 1/13439* (2013.01); *G02F 1/13454* (2013.01)

(58) Field of Classification Search
None
See application file for complete search history.

(56) References Cited

U.S. PATENT DOCUMENTS

| 11,693,281 B2* | 7/2023 | Sakurai | G02F 1/134363 349/139 |
| 2005/0179844 A1* | 8/2005 | Roosendaal | G02F 1/1391 349/139 |

(Continued)

FOREIGN PATENT DOCUMENTS

| CN | 103852940 A | 6/2014 |
| CN | 103852942 A | 6/2014 |

(Continued)

OTHER PUBLICATIONS

CN202080003299.X first office action.

(Continued)

*Primary Examiner* — Ryan Crockett
(74) *Attorney, Agent, or Firm* — IPro, PLLC

(57) ABSTRACT

A pixel electrode, including: a plurality of strip-shaped first electrodes, where the plurality of the first electrodes are arranged along a first direction, each of the first electrodes extends along a second direction, and the second direction intersects with the first direction; a second electrode, where the second electrode is connected to first ends of the plurality of first electrodes, and the first ends of the plurality of first electrodes are connected through the second electrode; and a third electrode, where the third electrode is connected to a second end of at least one of the first electrodes, and a (Continued)

direction of an electric field of an area in which the third electrode is disposed intersects with both the first direction and the second direction.

10 Claims, 11 Drawing Sheets

(56) References Cited

U.S. PATENT DOCUMENTS

| | | |
|---|---|---|
| 2008/0204614 A1 | 8/2008 | Aota et al. |
| 2010/0296040 A1 | 11/2010 | Han et al. |
| 2012/0218501 A1* | 8/2012 | Lee .................. G02F 1/134309 |
| | | 349/139 |
| 2014/0240629 A1 | 8/2014 | Zhou et al. |
| 2015/0116644 A1 | 4/2015 | Morishita et al. |
| 2015/0205171 A1 | 7/2015 | Tsuruma et al. |
| 2016/0306238 A1 | 10/2016 | Huh et al. |
| 2017/0255067 A1 | 9/2017 | Ito |
| 2019/0137831 A1 | 5/2019 | Liu |
| 2021/0349357 A1* | 11/2021 | Chen ................. G02F 1/134309 |
| 2022/0308406 A1* | 9/2022 | Liu .................... G02F 1/134309 |
| 2022/0342266 A1 | 10/2022 | Hu et al. |
| 2023/0060511 A1 | 3/2023 | Yang et al. |

FOREIGN PATENT DOCUMENTS

| | | |
|---|---|---|
| CN | 103941485 A | 7/2014 |
| CN | 105892171 A | 8/2016 |
| CN | 106908978 A | 6/2017 |
| CN | 107065367 A | 8/2017 |
| CN | 107179637 A | 9/2017 |
| CN | 109445246 A | 3/2019 |
| CN | 109557733 A | 4/2019 |
| CN | 109765732 A | 5/2019 |
| CN | 110928066 A | 3/2020 |
| CN | 111610677 A | 9/2020 |
| CN | 113467138 A | 10/2021 |
| IN | 105700254 A | 6/2016 |
| JP | 2015141037 A | 8/2015 |

OTHER PUBLICATIONS

PCT/CN2022/090564 international search report and written opinion.
U.S. Appl. No. 17/976,079 Non-final office action Aug. 4, 2023.
1 U.S. Appl. No. 17/976,079 final office action Jan. 8, 2024.
U.S. Appl. No. 17/976,079 Non-final Action dated Apr. 29, 2024.
U.S. Appl. No. 17/912,911 Non-final Action dated Apr. 30, 2024.

* cited by examiner

PIXEL ELECTRODE, PIXEL STRUCTURE, DISPLAY PANEL, AND DISPLAY APPARATUS

CROSS-REFERENCE TO RELATED APPLICATION

This application is a US national stage of international application No. PCT/CN2020/135623, filed on Dec. 11, 2020, the disclosure of which is incorporated herein by reference in its entirety.

TECHNICAL FIELD

The present disclosure relates to the field of display technologies, and in particular, relates to a pixel electrode, a pixel structure, a display panel, and a display apparatus.

BACKGROUND

Liquid crystal display (LCD) panels are widely used in display apparatuses due to low power consumption.

SUMMARY

The present disclosure provides a pixel electrode, a pixel structure, a display panel, and a display apparatus. The technical solutions are as follows.

According to a first aspect, a pixel electrode is provided. The pixel electrode includes:
 a plurality of strip-shaped first electrodes, where the plurality of the first electrodes are arranged along a first direction, each of the first electrodes extends along a second direction, and the second direction intersects with the first direction;
 a second electrode, where the second electrode is connected to first ends of the plurality of first electrodes, and the first ends of the plurality of first electrodes are connected through the second electrode: and
 a third electrode, where the third electrode is connected to a second end of at least one of the first electrodes, and a direction of an electric field of an area in which the third electrode is disposed intersects with both the first direction and the second direction.

According to another aspect, a pixel structure is provided. The pixel structure includes: a common electrode, a liquid crystal layer, and the pixel electrode according to the foregoing aspect: and
 the common electrode and the pixel electrode are configured to drive a liquid crystal in the liquid crystal layer to rotate.

According to still another aspect, a display panel is provided. The display panel includes a base substrate, and a plurality of pixel structures disposed on the base substrate and described in the foregoing aspect.

According to yet another aspect, a display apparatus is provided. The display apparatus includes a driving circuit and the display panel according to the foregoing aspect: and
 the driving circuit is configured to provide a driving signal for a pixel structure in the display panel.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

To make the objectives, technical solutions and advantages of the present disclosure clearer, the followings will describe the embodiments of the present disclosure in detail with reference to the drawings.

In the related art, a pixel electrode in a liquid crystal display panel generally includes a plurality of strip-shaped electrodes, a first connection electrode for connecting one end of the plurality of strip electrodes, and a second connection electrode for connecting the other end of the plurality of strip electrodes. Both an extension direction of the first connection electrode and an extension direction of the second connection electrode intersect with an extension direction of the plurality of strip-shaped electrodes.

However, an electric field at a joint of the plurality of strip-shaped electrodes and the connection electrode is relatively disordered. Therefore, when the liquid crystal display panel is squeezed by an external force, arrangement of liquid crystals disposed at the joint of the plurality of strip-shaped electrodes and the connection electrode in the liquid crystal display panel will be relatively disordered, and the LCD panel is prone to trace mura (trace mura).

Figure 1:
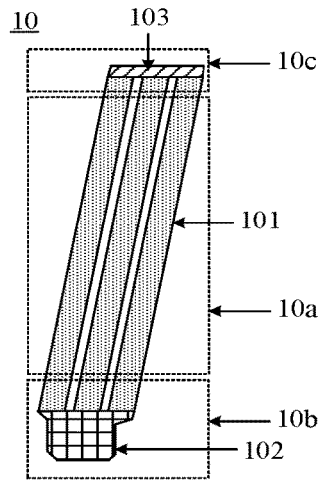
FIG. 1 is a schematic structural diagram of a pixel electrode in the related art.

FIG. 1 is a schematic structural diagram of a pixel electrode according to the related art. Referring to FIG. 1, the pixel electrode 10 includes a plurality of first electrodes 101, a second electrode 102 and a third electrode 103. The second electrode 102 is connected to ends at one side of the plurality of first electrodes 101, and the ends at one side of the plurality of first electrodes 101 are connected through the second electrode 102. The third electrode 103 is connected to the other end of each of the plurality of first electrodes 101, and the other ends of the plurality of first electrodes 101 are connected through the second electrode 103. Both ends of the first electrode 101 have no corners.

An electric field of a middle area 10a of the pixel electrode 10 is determined by the first electrode 101. An electric field of a first area 10b of the pixel electrode 10 including the second electrode 102 is determined by both the second electrode 102 and the first electrode 101. An electric field of a second area 10c of the pixel electrode 10 including the third electrode 103 is determined by both the third electrode 103 and the first electrode 101.

The first area 10b of the pixel electrode 10 is used to connect to a pixel circuit in a display panel, so that the pixel circuit provides a driving signal for the pixel electrode. If a common electrode in the display panel is disposed between the pixel electrode and the pixel circuit, the common electrode may be provided with a through hole, so that the pixel electrode is connected to the pixel circuit via the through hole. Since the through hole of the common electrode is disposed in the first area 10b, there may be no electric field or a weak electric field in the first area 10b. Liquid crystals disposed in the first area 10b in the display panel reach equilibrium mainly under an action of an anchoring force of a film disposed at a side of the pixel electrode 10 away from a base substrate.

Since the electric field of the middle area 10a in the pixel electrode 10 is determined by the first electrode 101, liquid crystals in the middle area 10a in the display panel can reach equilibrium under an action of the anchoring force of the film disposed at the side of the pixel electrode 10 away from the base substrate.

Since the common electrode is not provided with a through hole in the second area 10c, an electric field can be generated in an area in which the third electrode 103 and the first electrode 101 are disposed. Liquid crystals disposed in the second area 10c in the display panel can reach equilibrium under an action of the generated electric field around the third electrode 103 and the first electrode 101 and an action of the anchoring force of the film disposed at the side of the pixel electrode 10 away from the base substrate.

Figure 2:
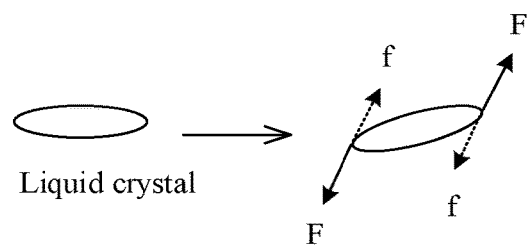
FIG. 2 is a schematic diagram of liquid crystal rotation according to an embodiment of the present disclosure.

Under a same applied voltage, the stronger the electric field F, the greater rotation angle of the liquid crystal and the stronger anchoring force f of the film disposed at the side of the pixel electrode 10 away from the base substrate. On the contrary, the weaker the electric field F, the smaller rotation angle of the liquid crystal and the weaker anchoring force f of the film disposed at the side of the pixel electrode 10 away from the base substrate. Referring to FIG. 2, when the liquid crystal reaches an equilibrium state, the electric field F is equal to the anchoring force f.

The liquid crystals disposed in the middle area 10a and the liquid crystals disposed in the second area 10c in the pixel electrode 10 in the display panel reach equilibrium under an impact of the electric field. Therefore, it can be analyzed whether the liquid crystals in these two areas can reach equilibrium under an action of the electric field.

Figure 3:
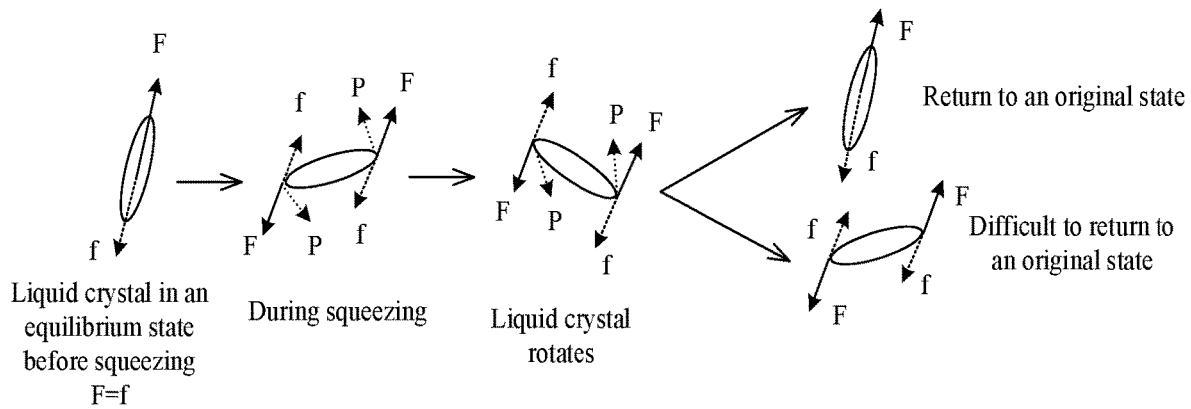
FIG. 3 is a schematic diagram of liquid crystal rotation in a display panel according to an embodiment of the present disclosure.
Figure 4:
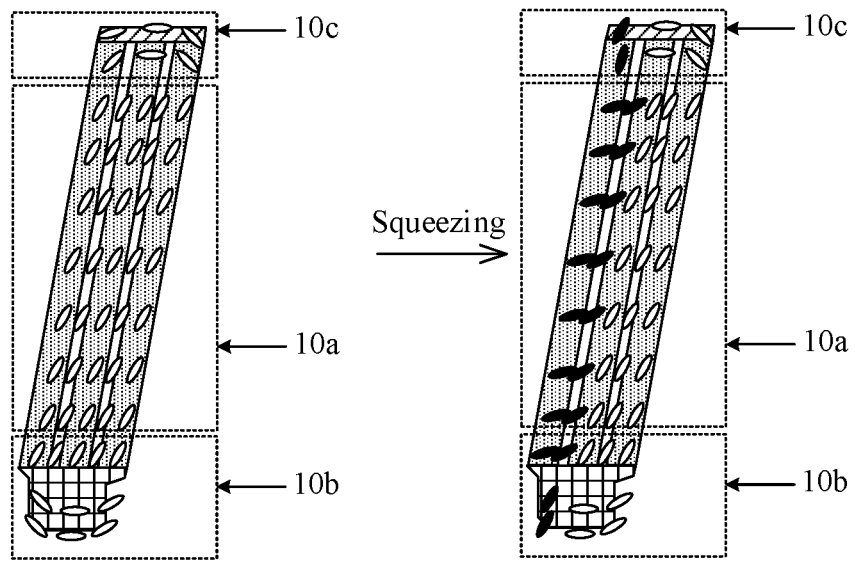
FIG. 4 is a schematic diagram of liquid crystal rotation in a display panel in the related art.

Referring to FIG. 3, before the display panel is squeezed by an external force, the electric field F and the anchoring force f received by the pixel electrode 10 may be equal, and the liquid crystals are in an equilibrium state under an action of the electric field F and the anchoring force f. When the display panel is squeezed by an external force, the liquid crystals in the display panel rotate under an action of the electric field F, the anchoring force f, and the squeezing force P. As shown in FIG. 4, the liquid crystals in the middle area 10a, the first area 10b, and the second area 10c in the pixel electrode 10 in the display panel all rotate.

Figure 5:
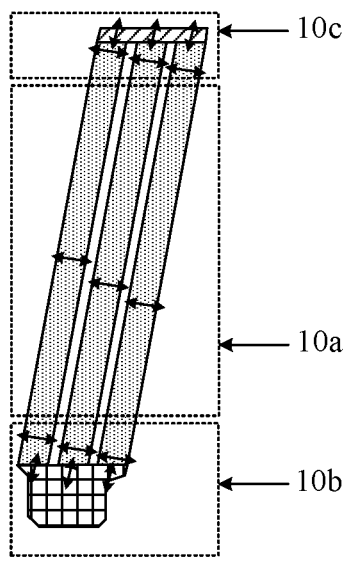
FIG. 5 is a schematic diagram of an electric field of the pixel electrode shown in FIG. 1.

Referring to FIG. 3, since the electric field in the middle area 10a in the pixel electrode 10 is relatively strong, the liquid crystals in the middle area 10a in the display panel can regain an equilibrium state (return to an original state) under the action of the electric field. Since a direction of the electric field of the second area 10c in the pixel electrode 10 is determined based on the first electrode 101 and the third electrode 103 which have different extension directions, the direction of the electric field of the second area 10c in the pixel electrode 10 is more disordered, referring to FIG. 5. Therefore, referring to FIG. 3, arrangement of the liquid crystals in the second area 10c in the display panel is relatively disordered (difficult to return to an original state), which in turns leads to the problem of darkening of local positions on the display panel, that is, trace mura occurs on the display panel.

Figure 6:
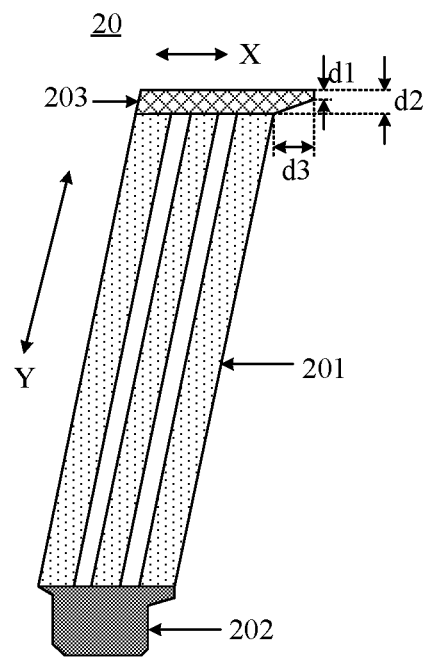
FIG. 6 is a schematic structural diagram of a pixel electrode according to an embodiment of the present disclosure.

An embodiment of the present disclosure provides a pixel electrode, which can solve a problem in the related art that the display panel is prone to trace mura. Referring to FIG. 6, the pixel electrode 20 may include a plurality of strip-shaped first electrodes 201, a second electrode 202, and a third electrode 203.

The plurality of first electrodes 201 may be arranged along a first direction X. and each first electrode 201 may extend along a second direction Y. and the second direction Y may intersect with the first direction X. For example, the first direction X may be a pixel row direction, and the second direction Y may intersect with both the pixel row direction and a pixel column direction.

The second electrode 202 may be connected to first ends of the plurality of first electrodes 201, and the first ends of the plurality of first electrodes 201 may be connected through the second electrode 202. In other words, each first electrode 201 can be connected to the second electrode 202. The second electrode 202 may be configured to connect to a pixel circuit in the display panel, so that the pixel circuit can provide a driving signal for the pixel electrode through the second electrode 202.

Figure 7:
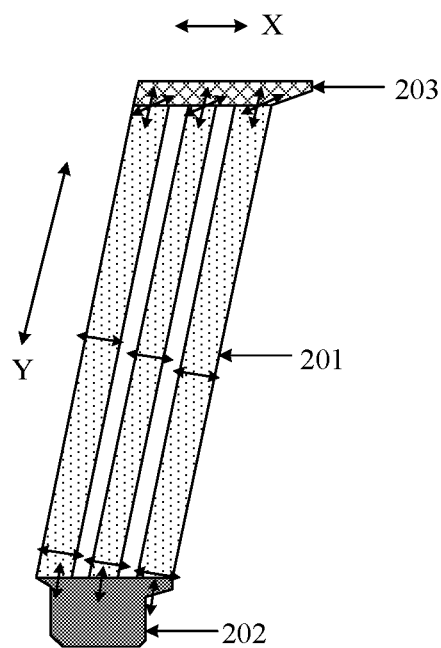
FIG. 7 is a schematic diagram of an electric field of the pixel electrode shown in FIG. 6.

The third electrode 203 may be connected to a second end of at least one first electrode 201, and a direction of an electric field of the area in which the third electrode 203 is located intersects with both the first direction X and the second direction Y. Therefore, referring to FIG. 7, a direction of an electric field at a joint of the second end of the first electrode 201 and the third electrode 203 may be relatively regular.

Figure 8:
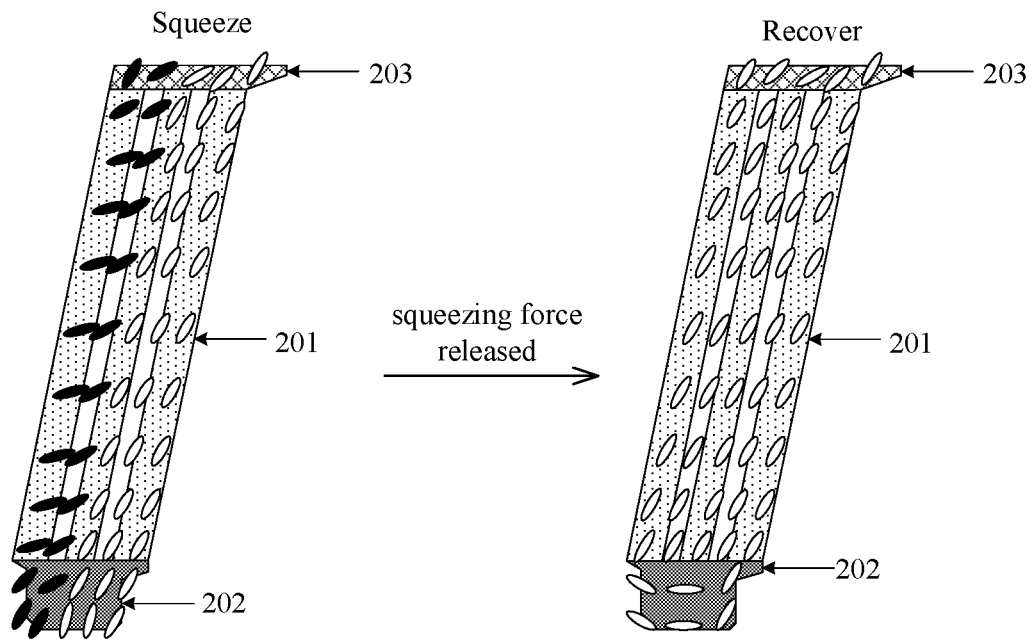
FIG. 8 is a schematic diagram of liquid crystal rotation in a display panel after a squeezing force is released according to an embodiment of the present disclosure.

Therefore, referring to FIG. 8, when the display panel is squeezed by an external force, liquid crystals in the first electrode 201, the second electrode 202, and the third electrode 203 in the pixel electrode 20 in the display panel all rotate. After the squeezing force is released, the liquid crystals in the first electrode 201 and the second electrode 202 in the display panel are regularly arranged, and liquid crystals at a joint of the third electrode 203 and the first electrode 201 in the display panel may also be regularly arranged under an action of the electric field formed by the third electrode 203 and the first electrode 201. Trace mura on the display panel can be avoided, and a display effect of the display panel is better.

In summary, the embodiment of the present disclosure provides a pixel electrode. The third electrode included in the pixel electrode is connected to the other end of at least one first electrode, and the direction of the electric field of the area in which the third electrode is located intersects with both the first direction and the second direction. The direction of the electric field formed at the joint of the third electrode and the second end of the first electrode is relatively regular, so that the liquid crystals disposed at the joint of the third electrode and the first electrode in the display panel can be arranged regularly under the action of the electric field. This avoids trace mura on the display panel, and a display effect of the display panel is better.

Optionally, referring to FIG. 6, the plurality of first electrodes 201 are linear, so that orientations of the liquid crystals of the display panel in each area of the plurality of first electrodes 201 are the same. Therefore, the display panel does not have a dark area, and light efficiency of the display panel is higher.

As an optional implementation, the third electrode 203 may extend along the first direction X, and the third electrode 203 may be connected to the second end of at least one first electrode 201, and at least one of a first end and a second end of the third electrode 203 protrudes in a direction away from the plurality of first electrodes 201 relative to second ends of the plurality of first electrodes 201.

Since at least one of the first end and the second end of the third electrode 203 protrudes in the direction away from the plurality of first electrodes 201 relative to the second ends of the plurality of first electrodes, an angle between an extension direction of the first electrode 201 and a direction of a connection line between the second end of the first electrode 201 and a protruding end of the third electrode 203 may be relatively small. The direction of the electric field at the joint of the second end of the first electrode 201 and the third electrode 203 may be relatively regular.

In the embodiment of the present disclosure, the first end of the third electrode 203 may be connected to the second end of at least one first electrode 201, and the second end of the third electrode 203 may protrude in the direction away from the plurality of first electrodes 201 relative to the second ends of the plurality of first electrodes 201.

Referring to FIG. 6, it can be seen that, the first end of the third electrode 203 may be connected to the second end of each first electrode 201. Alternatively, referring to FIG. 9, the first end of the third electrode 203 may be connected to a second end of a first target electrode 201a in the plurality of first electrodes 201, and other first electrodes 201 except the first target electrode 201a in the plurality of first electrodes 201 are all disposed on one side of the first target electrode 201a. In other words, the first target electrode 201a is a first electrode 201 disposed at the edge of the plurality of first electrodes 201.

Figure 9:
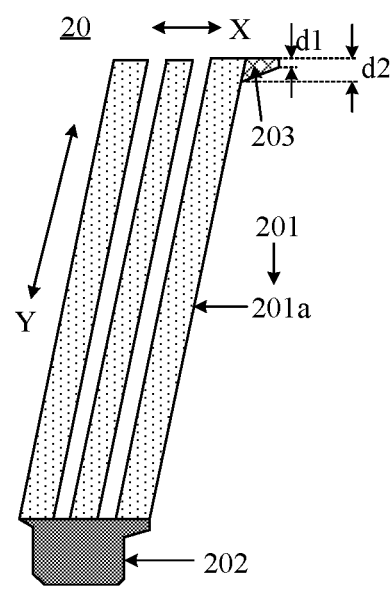
FIG. 9 is a schematic structural diagram of another pixel electrode according to an embodiment of the present disclosure.

For example, in FIG. 9, the first target electrode 201a is the rightmost first electrode in the plurality of first electrodes 201. Certainly, the first target electrode 201a may also be the leftmost first electrode in the plurality of first electrodes 201a.

Figure 10:
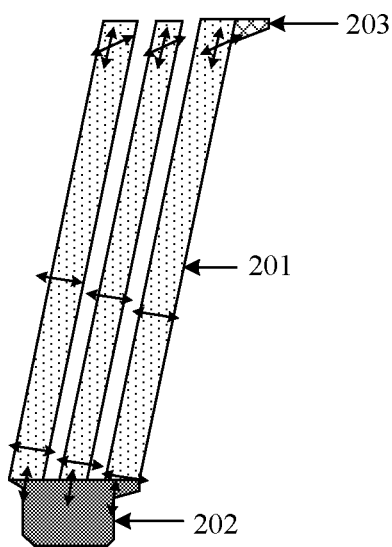
FIG. 10 is a schematic diagram of an electric field of the pixel electrode shown in FIG. 9.

For the pixel electrode 20 in FIGS. 6 and 9 described above, a direction of the protruding end of the third electrode 203 in the pixel electrode 20 is the same as a direction of a connection line between the second ends of the plurality of first electrodes 201. Therefore, refer to FIGS. 7 and 10, directions of an electric field formed by the third electrode 203 and the second ends of the plurality of first electrodes 201 are also the same.

Figure 11:
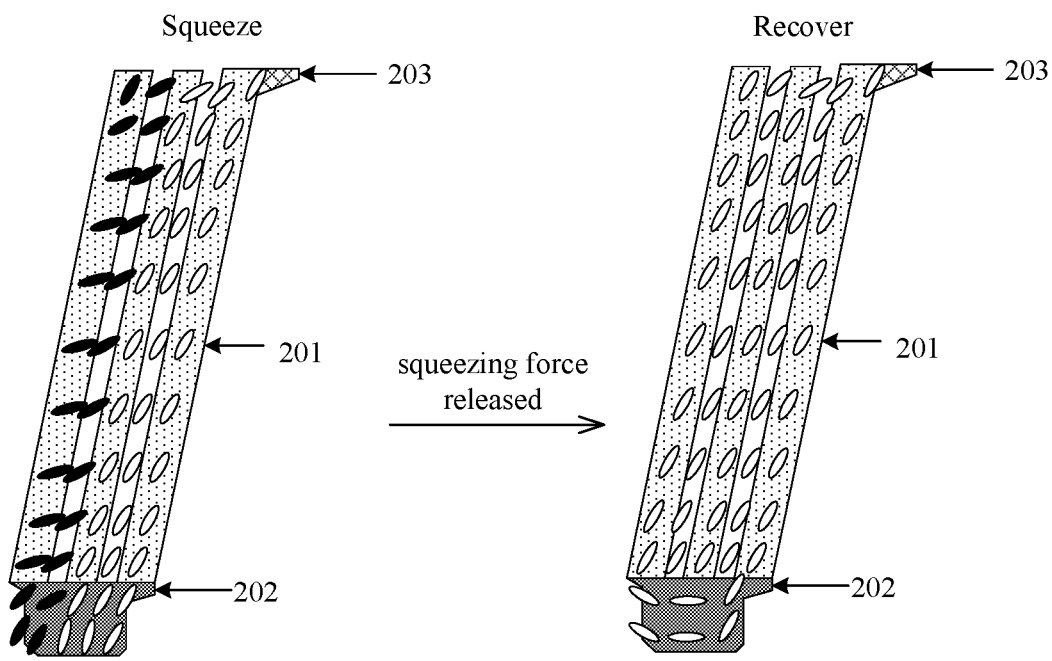
FIG. 11 is a schematic diagram of another type of liquid crystal rotation in a display panel after a squeezing force is released according to an embodiment of the present disclosure.

Referring to FIGS. 8 and 11, when the display panel is squeezed by an external force, the liquid crystals in the first electrode 201, the second electrode 202, and the third electrode 203 in the pixel electrode 20 in the display panel all rotate. After the squeezing force is released, the liquid crystals at the joint of the third electrode 203 and the first electrode 201 in the display panel may rotate under an action of the electric field formed by the third electrode 203 and the second ends of the first electrode 201. Since the directions of the electric field formed by the third electrode 203 and the second ends of the plurality of first electrodes 201 are the same, the liquid crystals disposed at the joint of the third electrode 203 and the first electrode 201 in the display panel can arrange in a same direction under an action of the electric field, so that a display effect of the display panel is better.

In the embodiment of the present disclosure, the number of arrangement directions of the liquid crystals disposed at the joint of the third electrode 203 and the first electrode 201 in the display panel may be positively related to the number of directions of the electric field formed by the third electrode 203 and the second ends of the plurality of first electrodes 201. In addition, the smaller the number of the arrangement directions of the liquid crystals disposed at the joint of the third electrode 203 and the first electrode 201 in the display panel, the more regular, the arrangement of the liquid crystals. In other words, the smaller the number of the directions of the electric field formed by the third electrode 203 and the second ends of the plurality of first electrodes 201, the more regular the arrangement of the liquid crystals disposed at the joint of the third electrode 203 and the first electrode 201 in the display panel. In this way, a display effect of the display panel is better.

Figure 12:
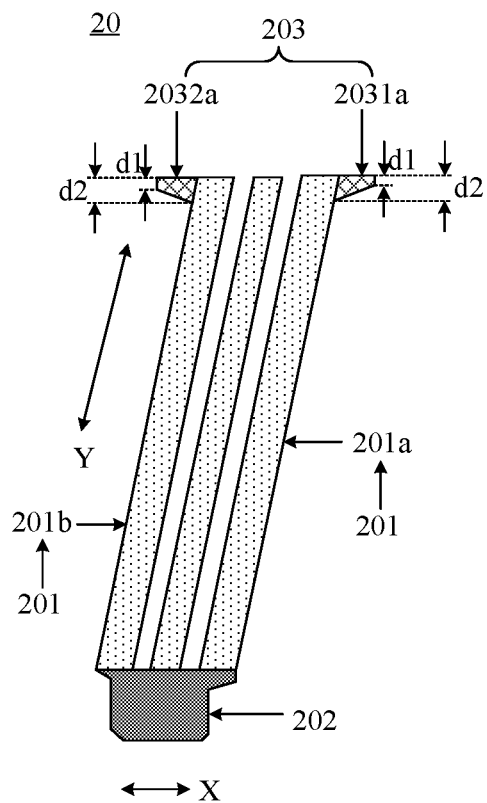
FIG. 12 is a schematic structural diagram of still another pixel electrode according to an embodiment of the present disclosure.

FIG. 12 is a schematic structural diagram of still another pixel electrode according to an embodiment of the present disclosure. Referring to FIG. 12, it can be seen that, the third electrode 203 may include a first sub-electrode 2031a and a second sub-electrode 2032a. A first end of the first sub-electrode 2031a may be connected to a second end of a first target electrode 201a in the plurality of first electrodes 201, and a second end of the first sub-electrode 2031a protrudes in a direction away from the plurality of first electrodes 201 relative to the second end of the first target electrode 201a. A first end of the second sub-electrode 2032a may be connected to a second end of a second target electrode 201b in the plurality of first electrodes 201, and a second end of the second sub-electrode 2032a protrudes in a direction away from the plurality of first electrodes 201 relative to the second end of the second target electrode 201b.

Other first electrodes except the first target electrode 201a in the plurality of first electrodes 201 may all be disposed on one side of the first target electrode 201a. Other first electrodes except the second target electrode 201b in plurality of first electrodes 201 may all be disposed on one side of the second target electrode 201b. In other words, the first target electrode 201a and the second target electrode 201b may be first electrodes 201 that are disposed at two edges of the plurality of first electrodes 201. For example, referring to FIG. 12, the first target electrode 201a is the rightmost first electrode in the plurality of first electrodes 201, and the second target electrode 201b is the leftmost first electrode in the plurality of first electrodes 201.

For the pixel electrode 20 shown in FIG. 12, a direction of a connection line between the first sub-electrode 2031a and the second end of the first target electrode 201a is different from a direction of a connection line between the second sub-electrode 2032a and the second end of the second target electrode 201b. Therefore, a direction of an electric field formed by the first sub-electrode 2031a and the second end of the first target electrode 201a is different from a direction of an electric field formed by the second sub-electrode 2032a and the second end of the second target electrode 201b. Therefore, an arrangement direction of liquid crystals disposed at a joint of the first sub-electrode 2031a and the second end of the first target electrode 201a in the display panel may be different from an arrangement direction of liquid crystals disposed at a joint of the second sub-electrode 2032a and the second end of the second target electrode 201b in the display panel.

However, the number of directions of the electric field formed by the third electrode 203 and the second ends of the plurality of first electrodes 201 is small. Therefore, the liquid crystals disposed at the joint of the third electrode 203 and the first electrode 201 in the display panel are more regularly arranged after the squeezing force is released, so that a display effect of the display panel is better.

Figure 13:
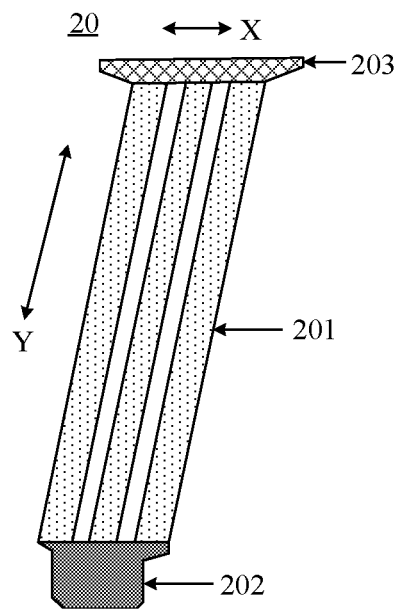
FIG. 13 is a schematic structural diagram of yet another pixel electrode according to an embodiment of the present disclosure.

FIG. 13 is a schematic structural diagram of yet another pixel electrode according to an embodiment of the present disclosure. Referring to FIG. 13, it can be seen that, the third electrode 203 may be connected to a second end of each first electrode 201, and a first end and a second end of the third electrode 203 protrude in a direction away from a plurality of first electrodes 201 relative to second ends of the plurality of first electrodes 201.

Since directions of connection lines between two protruding ends of the third electrode 203 and the second ends of the plurality of first electrodes 201 are different, directions of electric fields formed by the two protruding ends of the third electrode 203 and the second ends of the plurality of first electrodes 201 are different. For the pixel electrode 20 shown in FIG. 13, numbers of directions of the electric fields formed by the third electrode 203 and the second ends of the plurality of first electrodes 201 are also small, and a display effect of the display panel is better.

In addition, since the electric fields formed by the two protruding ends of the third electrode 203 and the second ends of the plurality of first electrodes 201 have different directions, arrangement directions of liquid crystals disposed at the two ends of the third electrode 203 in the display panel are different.

Referring to FIG. 6, FIG. 9, FIG. 12, and FIG. 13, a shape of a protruding end of the third electrode 203 may be a trapezoid or a triangle. A width d1 of a side, which is away from the plurality of first electrodes 201, of the protruding end of the third electrode 203 may be smaller than a width d2 of a side, which is closer to the plurality of first electrodes 201, of the protruding end of the third electrode 203. Certainly, the protruding end of the third electrode 203 may alternatively be of another shape, which is not limited in the embodiment of the present disclosure.

In the embodiment of the present disclosure, referring to FIG. 6, the electric field formed by the third electrode 203 and the second ends of the plurality of first electrodes 201 is determined jointly by a distance d3 between the protruding end of the third electrode 203 and the plurality of first electrodes 201, and the width d2 of the side, which is closer to the plurality of first electrodes 201, of the protruding end of the third electrode. Further, the distance d3 between the protruding end of the third electrode 203 and the plurality of first electrodes 201 correlates with the width d2 of the side, which is closer to the plurality of first electrodes 201, of the protruding end of the third electrode.

Optionally, when the width d2 of the side, which is closer to the plurality of first electrodes 201, of the protruding end of the third electrode 203 is less than or equal to 2.5 µm, and the distance d3 between the protruding end of the third electrode 203 and the plurality of first electrodes 201 is greater than or equal to 1.2 µm, trace mura does not exist on the display panel. When the width d2 of the side, which is closer to the plurality of first electrodes 201, of the protruding end of the third electrode is greater than 2.5 µm and less than or equal to 3.5 µm, and the distance d3 between the protruding end of the third electrode 203 and the plurality of first electrodes 201 is greater than or equal to 1.87 µm, trace mura does not exist on the display panel. When the width d2 of the side, which is closer to the plurality of first electrodes 201, of the protruding end of the third electrode is greater than 3.5 µm and less than or equal to 4.5 µm, and the distance d3 between the protruding end of the third electrode 203 and the plurality of first electrodes 201 is greater than or equal to 3.3 µm, trace mura does not exist on the display panel.

In other words, to avoid trace mura on the display panel, the following conditions need to be met: $d2 \leq 2.5$ µm, and $d3 \geq 1.2$ µm: 2.5 µm$<d2 \leq 3.5$ µm, and $d3 \geq 1.87$ µm: or 3.5 µm$<d2 \leq 4.5$ µm, and $d3 \geq 3.3$ µm.

Figure 14:
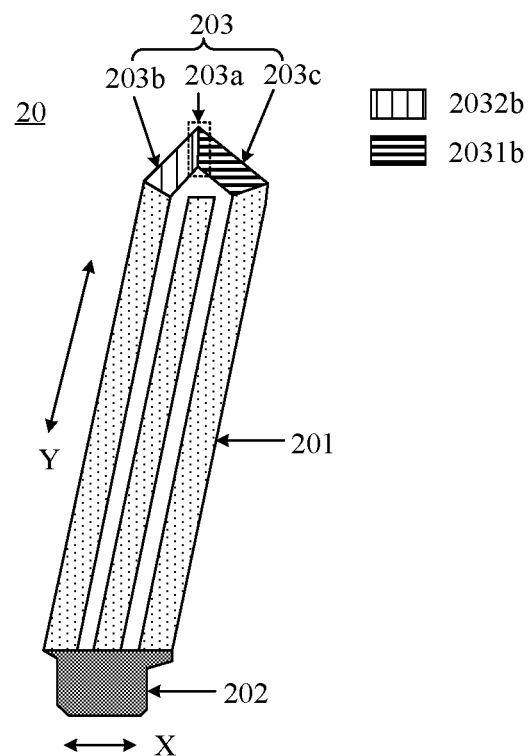
FIG. 14 is a schematic structural diagram of still yet another pixel electrode according to an embodiment of the present disclosure.

As another optional implementation, referring to FIG. 14, an extension direction of the third electrode 203 may intersect with both the first direction X and the second direction Y, the first end of the third electrode 203 may be connected to one second end of the first electrode 201, and there may be at most one bent portion 203a between the first end and the other end of the third electrode 203.

Figure 15:
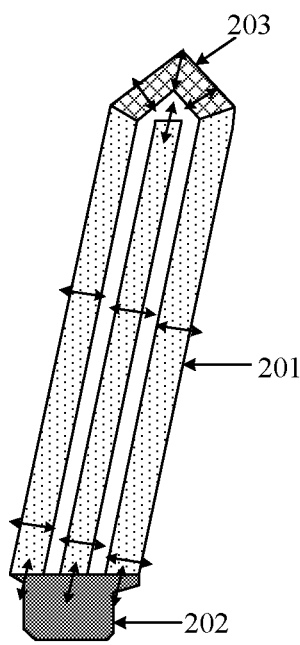
FIG. 15 is a schematic diagram of an electric field of the pixel electrode shown in FIG. 14.

Since there is at most one bent portion 203a between the first end and the second end of the third electrode 203, angles between parts of the third electrode 203 disposed on both sides of the bent portion 203a and the extension direction of the first electrode 201 may both be smaller. Referring to FIG. 15, a direction of an electric field at a joint of the second end of the first electrode 201 and the third electrode 203 may be relatively regular. Therefore, referring to FIG. 16, when the display panel is squeezed by an external force, liquid crystals in the first electrode 201, the second electrode 202, and the third electrode 203 in the pixel electrode 20 in the display panel all rotate. After the squeezing force is released, the liquid crystals in the first electrode 201 and the second electrode 202 in the display panel are regularly arranged, and liquid crystals at a joint of the third electrode 203 and the first electrode 201 in the display panel may also be regularly arranged under a joint action of the third electrode 203 and the first electrode 201. This avoids trace mura on the display panel, and a display effect of the display panel is better.

Figure 16:
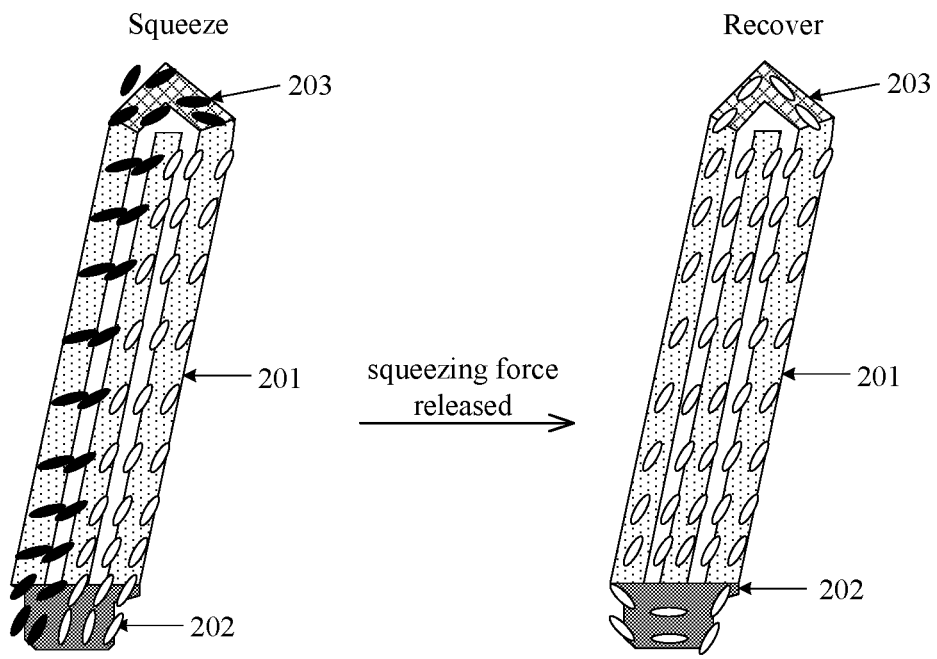
FIG. 16 is a schematic diagram of still another type of liquid crystal rotation in a display panel after a squeezing force is released according to an embodiment of the present disclosure.

Optionally, referring to FIG. 16, after the squeezing force is released, because the third electrode 203 is provided with the bent portion 203a, arrangement directions of liquid crystals on the two sides of the bent position 203a of the third electrode 203 are different, while arrangement directions of liquid crystals disposed on a same side of the bent portion 203a are the same. In other words, the liquid crystals disposed on the same side of the bent portion 203a are regularly arranged. The third electrode 203 has at most one bent portion 203a, which can make the liquid crystals disposed at the joint of the third electrode 203 and the first electrode 201 have at most two arrangement directions. This avoids trace mura on the display panel, and a display effect of the display panel is better.

Referring to FIG. 14, both a first part 203b between the first end of the third electrode 203 and the bent portion 203a and a second part 203c between the second end of the third electrode 203 and the bent portion 203a may be of a strip structure, and an extension direction of the first part 203b intersects with an extension direction of the second part 203c. Referring to FIG. 14, the pixel electrode 20 may be pencil-shaped.

As can be further seen from FIG. 14, the third electrode 203 may include a strip-shaped third sub-electrode 2031b and a strip-shaped fourth sub-electrode 2032b, and an extension direction of the third sub-electrode 2031b may intersect with an extension direction of the fourth sub-electrode 2032b.

One end of the third sub-electrode 2031b may be connected to a second end of one first electrode 201. The other end of the third sub-electrode 2031b may be connected to one end of the fourth sub-electrode 2032b, and the other end of the third sub-electrode 2031b and the one end of the fourth sub-electrode 2032b form the bent portion 203a. The other end of the fourth sub-electrode 2032b may be connected to a second end of another first electrode 201. The one end of the third sub-electrode 2031b is the first end of the third electrode 203, and the other end of the fourth sub-electrode 2032b is the second end of the third electrode 203.

Figure 17:
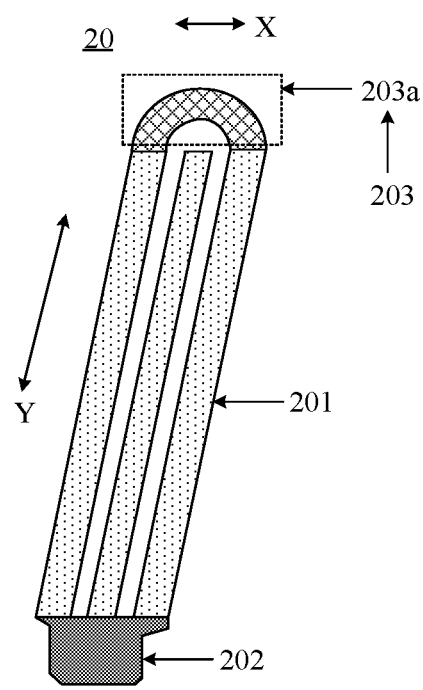
FIG. 17 is a schematic structural diagram of a further pixel electrode according to an embodiment of the present disclosure.

FIG. 17 is a schematic structural diagram of a further pixel electrode according to an embodiment of the present disclosure. As can be seen from FIG. 17, the bent portion 203a may be arc-shaped. For example, the third electrode 203 may be an arc-shaped electrode.

Referring to FIG. 14 and FIG. 17, the first end of the third electrode 203 may be connected to a second end of one first electrode 201, and the second end of the third electrode 203 may be connected to a second end of another first electrode 201. In other words, each of the two ends of the third electrode 203 is connected to one first electrode 201.

Figure 18:
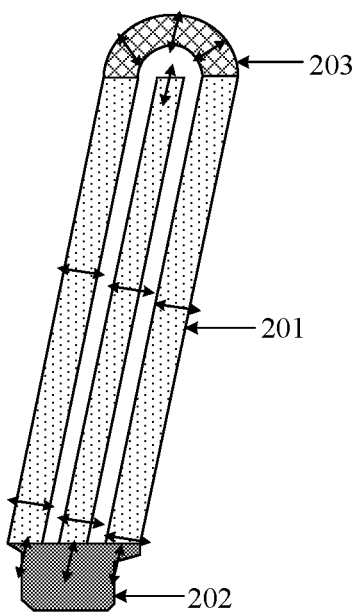
FIG. 18 is a schematic diagram of an electric field of the pixel electrode shown in FIG. 17.
Figure 19:
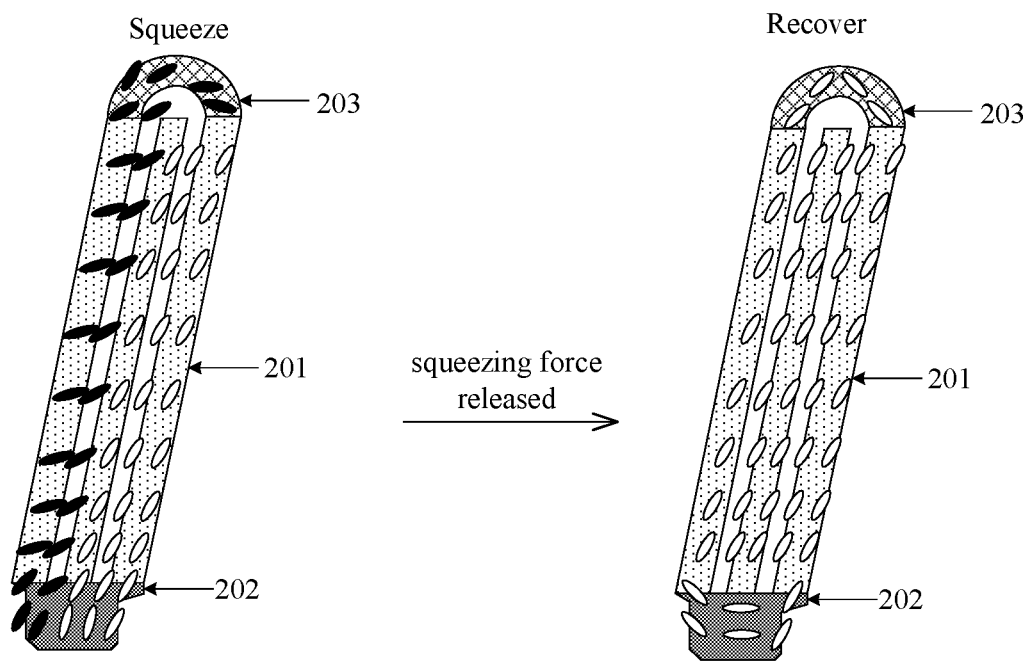
FIG. 19 is a schematic diagram of yet another type of liquid crystal rotation in a display panel after a squeezing force is released according to an embodiment of the present disclosure.

FIG. 18 is a schematic diagram of an electric field of the pixel electrode shown in FIG. 17. As can be seen from FIG. 18, a direction of an electric field at a joint of the second end of the first electrode 201 and the third electrode 203 in the pixel electrode shown in FIG. 17 is relatively regular. Referring to FIG. 19, when the display panel is squeezed by an external force, liquid crystals in the first electrode 201, the second electrode 202, and the third electrode 203 in the pixel electrode 20 in the display panel all rotate. After the squeezing force is released, the liquid crystals in the first electrode 201 and the second electrode 202 in the display panel are regularly arranged, and the liquid crystals at the joint of the third electrode 203 and the first electrode 201 in the display panel may also be regularly arranged under a joint action of the third electrode 203 and the first electrode 201. This avoids trace mura on the display panel, and a display effect of the display panel is better.

In the embodiment of the present disclosure, there may be three or more first electrodes 201 in the pixel electrode 20. Then, other first electrodes in the plurality of first electrodes 201 except the two first electrodes 201 connected to the first end and the second end of the third electrode 203 may all be disposed between the two first electrodes 201. In other words, the two first electrodes 201 connected to the first end and the second end of the third electrode 203 may be two first electrodes 201 disposed at the edges of the plurality of first electrodes 201 respectively.

If there are three first electrodes 201 in the pixel electrode, the plurality of first electrodes 201 may include one other first electrode. If there are more than three first electrodes 201 in the pixel electrode 20, the plurality of first electrodes 201 may include a plurality of other first electrodes.

Figure 20:
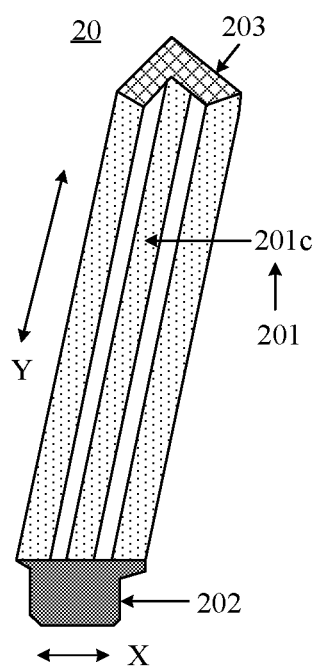
FIG. 20 is a schematic structural diagram of a still further pixel electrode according to an embodiment of the present disclosure.

FIG. 20 is a schematic structural diagram of a still further pixel electrode according to an embodiment of the present disclosure. As can be seen from FIG. 20, the other end of at least one other first electrode 201c may be connected to a middle part of the third electrode 203, and the middle part of the third electrode 203 may be disposed between the first end and the second end of the third electrode 203. A length of the other first electrode 201c is greater than lengths of the first electrodes 201 to which the first end and the second end of the third electrode 203 are respectively connected.

In summary; the embodiment of the present disclosure provides a pixel electrode. The third electrode included in the pixel electrode is connected to the other end of at least one first electrode, and the direction of the electric field of the area in which the third electrode is located intersects with both the first direction and the second direction. The direction of the electric field formed at the joint of the third electrode and the second end of the first electrode is relatively regular, so that the liquid crystals disposed at the joint of the third electrode and the first electrode in the display panel can be arranged regularly under the action of the electric field. This avoids trace mura on the display panel, and a display effect of the display panel is better.

Figure 21:
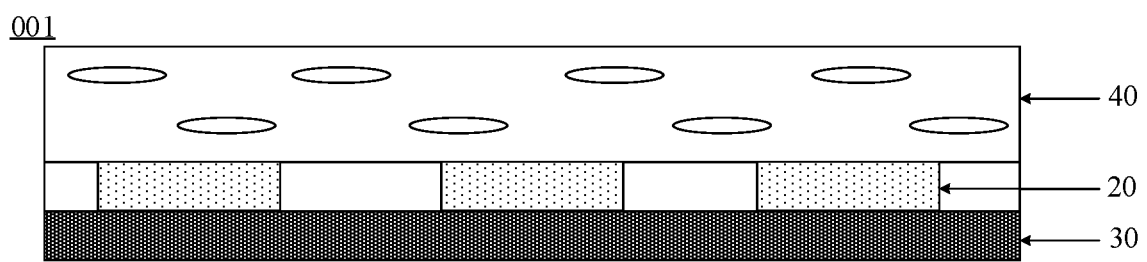
FIG. 21 is a schematic structural diagram of a pixel structure according to an embodiment of the present disclosure.

FIG. 21 is a schematic structural diagram of a pixel structure according to an embodiment of the present disclosure. As can be seen from FIG. 21, a pixel structure 001 may include a common electrode 30, a liquid crystal layer 40, and the pixel electrode 20 provided in the foregoing embodiment. The common electrode 30 and the pixel electrode 20 can be configured to drive a liquid crystal in the liquid crystal layer 40 to rotate.

Figure 22:
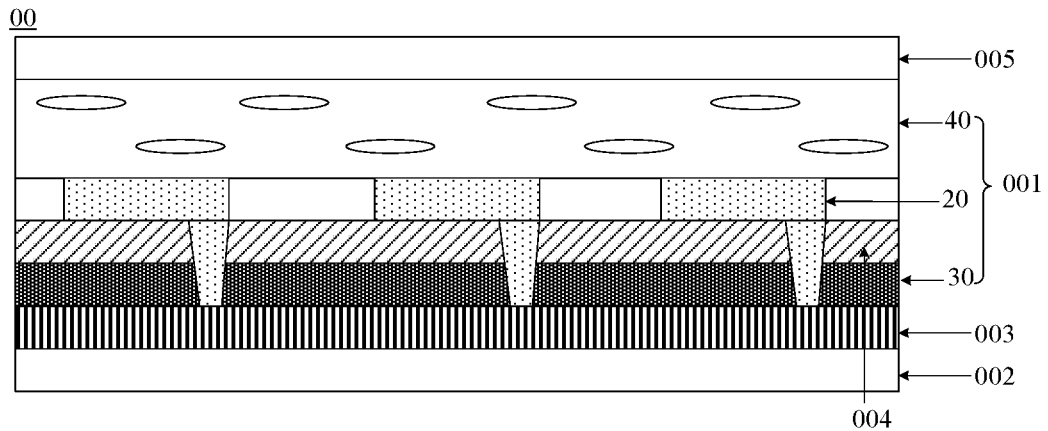
FIG. 22 is a schematic structural diagram of a display panel according to an embodiment of the present disclosure.

FIG. 22 is a schematic structural diagram of a display panel according to an embodiment of the present disclosure. A display panel 00 may include a base substrate 002 and a plurality of pixel structures 001 disposed on the base substrate 002 which are provided in the foregoing embodiments.

As can further be seen from FIG. 22, the display panel 00 may further include a pixel circuit 003 and a passivation layer 004. The pixel circuit 003, and a common electrode 30, the passivation layer 004, a pixel electrode 20 and a liquid crystal layer 40 in the pixel structure 003 may be stacked on a side away from the base substrate 002.

The common electrode 30 may be provided with a first through hole, the passivation layer 004 may be provided with a second through hole communicating with the first through hole, and a second electrode 202 in the pixel electrode 20 may be connected to the pixel circuit 003 via the first through hole and the second through hole.

The pixel circuit 003 may include a transistor. A gate of the transistor may be connected to a gate line, a source of the transistor may be connected to a data line, and a drain of the transistor may be connected to the pixel electrode 20. For example, the drain of the transistor may be connected to the second electrode 202 in the pixel electrode 20.

Referring to FIG. 22, the display panel 00 may further include a color film substrate 005. The color film substrate 005 may be disposed on a side of the pixel structure 001 away from the base substrate 002. The color film substrate 005 may be configured to convert light into colored light.

Figure 23:
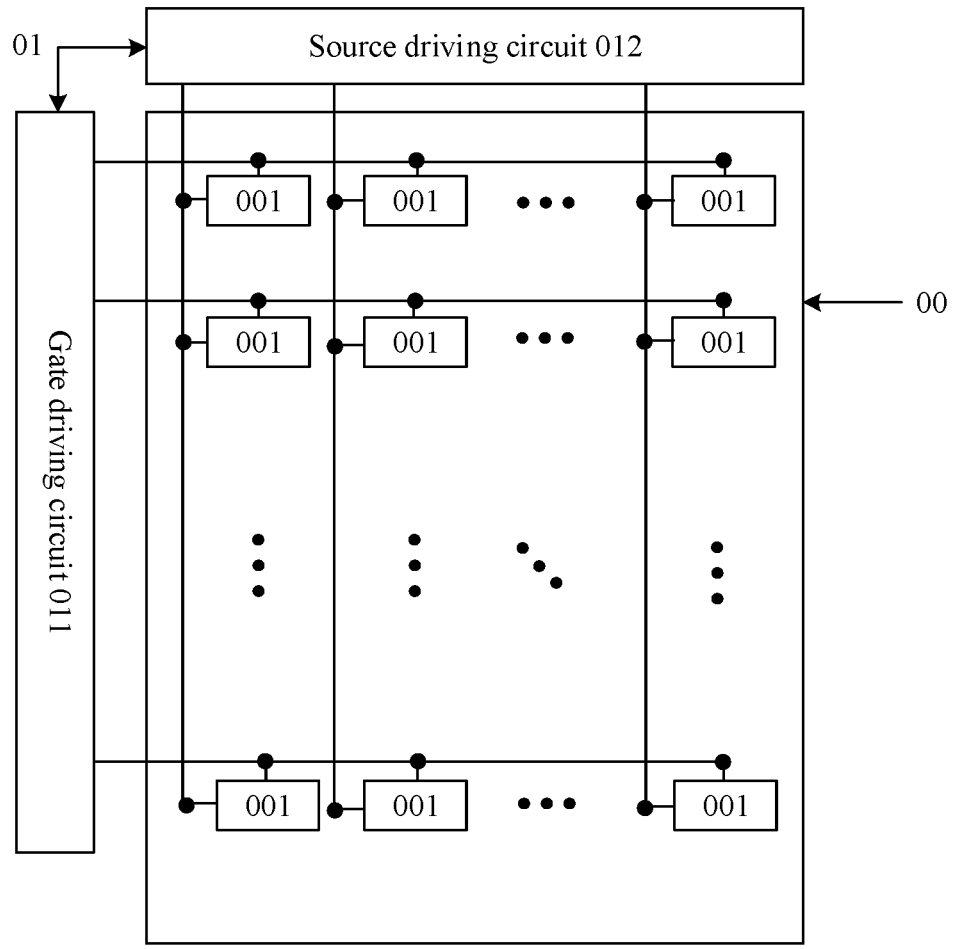
FIG. 23 is a schematic structural diagram of a display apparatus according to an embodiment of the present disclosure.

FIG. 23 is a schematic structural diagram of a display apparatus according to an embodiment of the present disclosure. As can be seen from FIG. 23, the display apparatus may include a driving circuit 01 and the display panel 00 described in the foregoing embodiment. The driving circuit 01 may be configured to provide a driving signal for a pixel structure 001 in the display panel 00.

Referring to FIG. 23, the driving circuit 01 may include a gate driving circuit 011 and a source driving circuit 012. The gate driving circuit 011 may be connected to each row of pixel structures 001 in the display panel 00 through gate lines, and configured to provide gate driving signals for each row of pixel structures 001. The source driving circuit 012 may be connected to each column of the pixel structures 001 in the display panel 00 through data lines, and is used to provide data signals for each column of pixel structures 001.

Optionally, the display apparatus may be any product or component with a display function, such as a liquid crystal display apparatus, electronic paper, a mobile phone, a tablet computer, a TV, a display, a notebook computer, a digital photo frame, or a navigator.

The above descriptions are merely optional embodiments of the present disclosure and are not intended to limit the present disclosure. Any modification, equivalent replacement, improvement, or the like made within the spirit and principle of the present disclosure shall fall within the protection scope of claims of the present disclosure.

What is claimed is:

1. A pixel electrode, comprising:
    a plurality of strip-shaped first electrodes, wherein the plurality of the first electrodes are arranged along a first direction, each of the first electrodes extends along a second direction, and the second direction intersects with the first direction;
    a second electrode, wherein the second electrode is connected to first ends of the plurality of first electrodes, and the first ends of the plurality of first electrodes are connected through the second electrode; and
    a third electrode, wherein the third electrode is connected to a second end of at least one of the first electrodes, and a direction of an electric field of an area in which the third electrode is disposed intersects with both the first direction and the second direction; and
    wherein,
    the third electrode comprises a first sub-electrode and a second sub-electrode;
    a first end of the first sub-electrode is connected to a second end of a first target electrode in the plurality of first electrodes, and a second end of the first sub-electrode protrudes in a direction away from the plurality of first electrodes relative to the second end of the first target electrode;
    a first end of the second sub-electrode is connected to a second end of a second target electrode in the plurality of first electrodes, and a second end of the second sub-electrode protrudes in a direction away from the plurality of first electrodes relative to the second end of the second target electrode; and
    other first electrodes except the first target electrode in the plurality of first electrodes are all disposed on one side of the first target electrode, and other first electrodes except the second target electrode in the plurality of first electrodes are all disposed on one side of the second target electrode,
    or,
    wherein the third electrode is connected to a second end of each of the first electrodes, and both a first end and a second end of the third electrode protrude relative to second ends of the plurality of first electrodes in a direction away from the plurality of first electrodes; and
    wherein an extension direction of the third electrode intersects with both the first direction and the second direction, a first end of the third electrode is connected to a second end of one of the first electrodes, and there is at most one bent portion between the first end and the second end of the third electrode;
    wherein both a first part between the first end of the third electrode and the bent portion and a second part between the second end of the third electrode and the bent portion are of a strip structure, and an extension direction of the first part intersects with an extension direction of the second part; or
    the bent portion is arc-shaped.

2. The pixel electrode according to claim 1, wherein the first end of the third electrode is connected to a second end of a first target electrode in the plurality of first electrodes; and
    other first electrodes except the first target electrode in the plurality of first electrodes are all disposed on one side of the first target electrode.

3. The pixel electrode according to claim 1, wherein the first end of the third electrode is connected to a second end of one of the first electrodes, and the second end of the third electrode is connected to a second end of another first electrode.

4. The pixel electrode according to claim 1, wherein the third electrode comprises a third sub-electrode and a fourth sub-electrode which are both strip-shaped, and an extension direction of the third sub-electrode intersects with an extension direction of the fourth sub-electrode; and
    a first end of the third sub-electrode is connected to a second end of one of the first electrodes, a second end of the third sub-electrode is connected to a first end of the fourth sub-electrode, the second end of the third sub-electrode and the first end of the fourth sub-electrode form the bent portion, and a second end of the fourth sub-electrode is connected to a second end of another first electrode.

5. The pixel electrode according to claim 3, wherein a number of the first electrodes comprised in the pixel electrode is greater than or equal to 3; and other first electrodes in the plurality of first electrodes except two first electrodes respectively connected to the first end and the second end of the third electrode are all disposed between the two first electrodes.

6. The pixel electrode according to claim 5, wherein a second end of at least one of the other first electrodes is connected to a middle part of the third electrode, and the middle part of the third electrode is disposed between the first end and the second end of the electrode.

7. A pixel structure, comprising a common electrode, a liquid crystal layer, and the pixel electrode according to claim 1; and the common electrode and the pixel electrode are configured to drive a liquid crystal in the liquid crystal layer to rotate.

8. A display panel, wherein the display panel comprises a base substrate, and a plurality of pixel structures according to claim 7 disposed on the base substrate.

9. The display panel according to claim 8, wherein the display panel further comprises a pixel circuit and a passivation layer;

the pixel circuit, and a common electrode, the passivation layer and a pixel electrode in the pixel structure are sequentially stacked on a side away from the base substrate; and the common electrode is provided with a first through hole, the passivation layer is provided with a second through hole communicating with the first through hole, and a second electrode in the pixel electrode is connected to the pixel circuit via the first through hole and the second through hole.

10. A display apparatus, wherein the display apparatus comprises a driving circuit and the display panel according to claim 8; and the driving circuit is configured to provide a driving signal for a pixel structure in the display panel.

* * * * *